No. 631,011. Patented Aug. 15, 1899.
A. C. HENDRICKS.
BACK PEDALING BRAKE.
(Application filed Sept. 1, 1896.)

(No Model.) 2 Sheets—Sheet 1.

Witnesses.
Robert Everett,
Albert H. Norris.

Inventor:
Adam C. Hendricks.
By James L. Norris.
Atty.

No. 631,011. Patented Aug. 15, 1899.
A. C. HENDRICKS.
BACK PEDALING BRAKE.
(Application filed Sept. 1, 1896.)
(No Model.) 2 Sheets—Sheet 2.
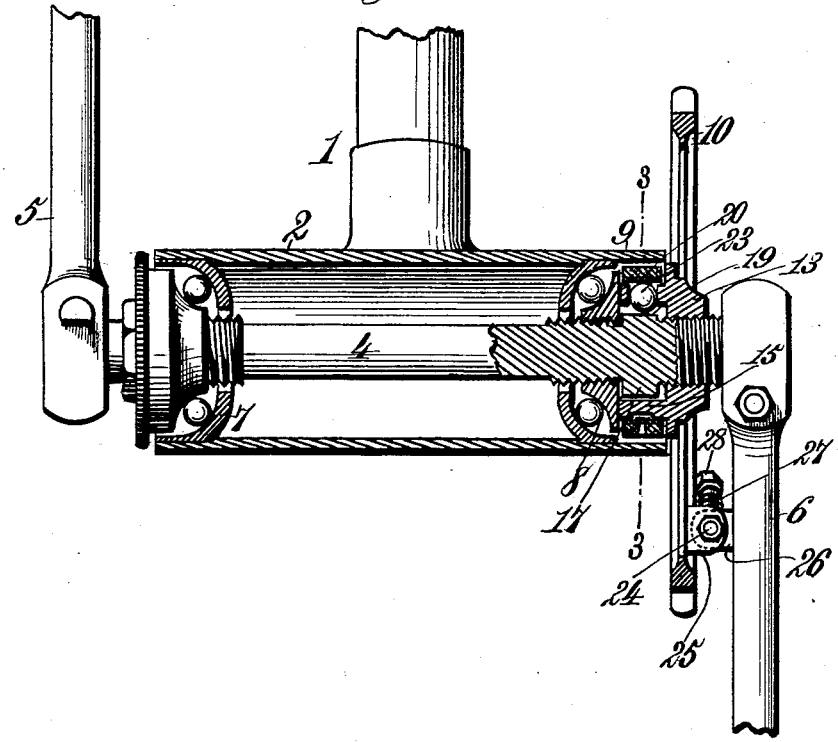
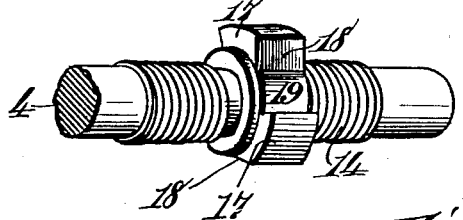
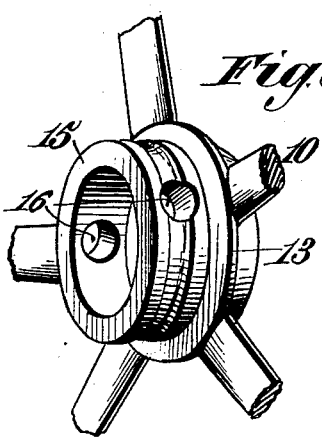
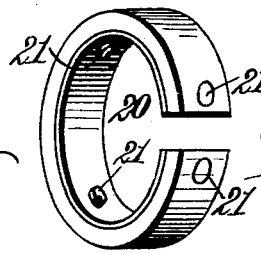
Witnesses.
Robert Everett,
Albert H. Norris.
Inventor.
Adam C. Hendricks,
By James L. Norris.
Atty.
THE NORRIS PETERS CO., PHOTO-LITHO., WASHINGTON, D. C.

UNITED STATES PATENT OFFICE.

ADAM C. HENDRICKS, OF MARTINSBURG, WEST VIRGINIA.

BACK-PEDALING BRAKE.

SPECIFICATION forming part of Letters Patent No. 631,011, dated August 15, 1899.

Application filed September 1, 1896. Serial No. 604,553. (No model.)

*To all whom it may concern:*

Be it known that I, ADAM C. HENDRICKS, a citizen of the United States, residing at Martinsburg, in the county of Berkeley and State of West Virginia, have invented new and useful Improvements in Brakes for Bicycles, &c., of which the following is a specification.

The chief object of the present invention is to provide a new and improved brake adapted to be thrown into action by back pedaling, and particularly designed for bicycles, but useful in connection with any type of wheeled vehicles driven by the rider through the medium of a chain belt and chain-wheels or their equivalent.

The invention also has for its object to provide a novel, simple, efficient, and economical brake mechanism operated by back pedaling and of such construction and so applied that it is possible to dispense with the usual hand-operated brake, which is more or less cumbersome and heavy in weight and injuriously affects the pneumatic or elastic tire of the drive-wheel.

The invention also has for its object to provide a new and improved wheel-brake which is thrown into action by the drive-chain of a bicycle when the rider back pedals or exerts back pressure on the pedals as they rise on the back strokes.

To the attainment of these objects my invention consists in the novel combination, arrangement, and operation of parts hereinafter described, and specified in the several clauses of the claim.

The invention is illustrated by the accompanying drawings, in which—

Figure 1:
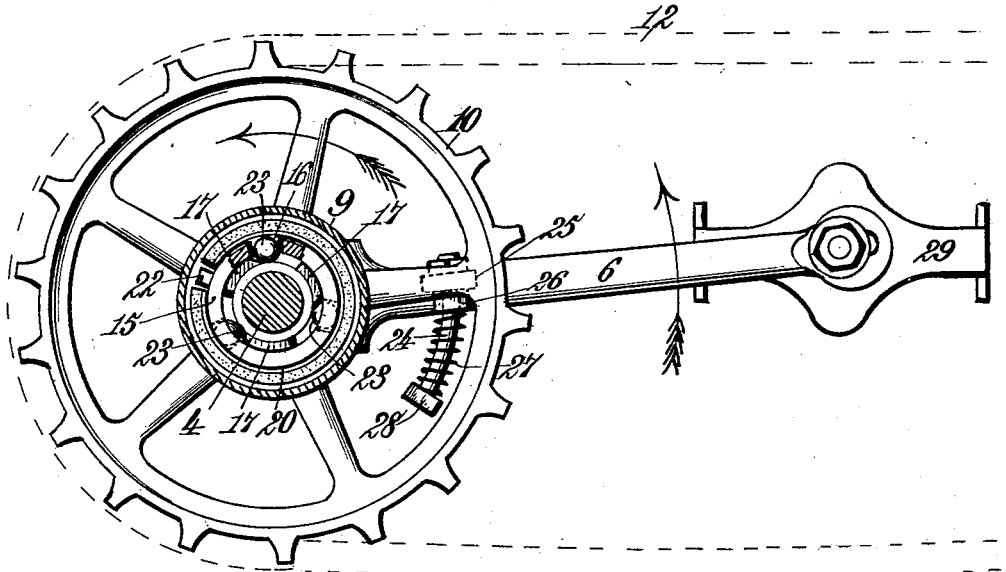
Figure 2:
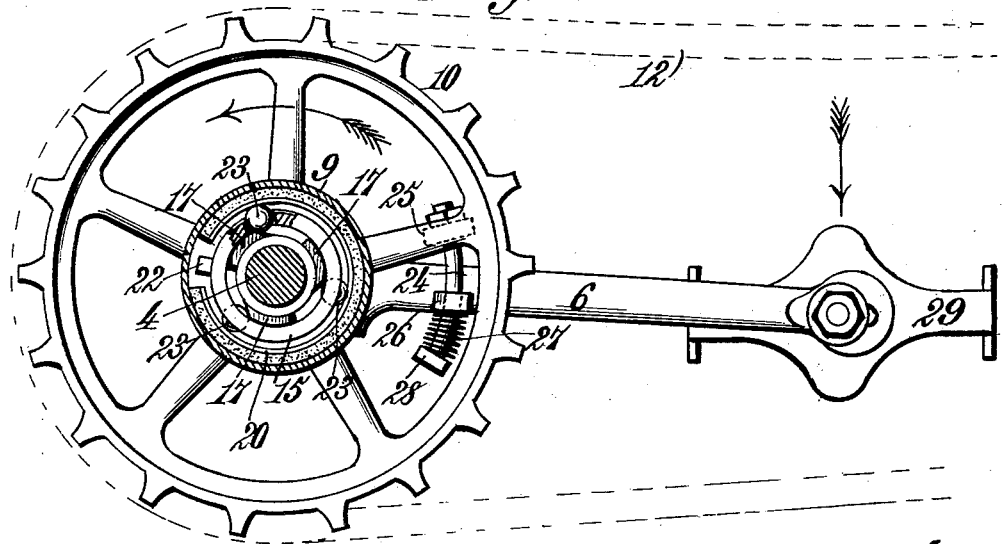

Figure 1 is a detail sectional side elevation taken on the line 3 3, Fig. 3, and showing my improved brake mechanism in operative connection with the shaft to which the pedal-carrying crank-arms of a bicycle are connected, the brake being in normal or inactive position. Fig. 2 is a similar view showing the position of the parts when down pressure is exerted by the foot of the rider on the pedal in its back stroke for the purpose of applying the brake. Fig. 3 is a sectional elevation longitudinally of the shaft to which the pedal-carrying crank-arms are secured. Fig. 4 is a detail perspective view of a portion of the shaft. Fig. 5 is a detail perspective view of the hub portion of the chain-wheel which is secured to the shaft, and Fig. 6 is a detail perspective view of the expansible clutch-ring.

In order to enable those skilled in the art to make and use my invention, I will now describe the same in detail, referring to the drawings, wherein—

The numeral 1, Fig. 3, indicates a part of the main frame of a bicycle, which part, as here shown, serves to suspend a horizontally-arranged sleeve 2, in which is mounted a pedal or driving shaft 4, having two crank-arms 5 and 6 rigidly secured to its ends to impart forward propulsion. The interior of the sleeve is provided with ball-bearings, as at 7 and 8, to secure the free and easy rotation of the shaft 4 in a manner similar to the ordinary pedal-shaft of a bicycle. The ball-bearings may be constructed in any manner suitable for the purpose, and therefore a detail description of the same is deemed unnecessary. The sleeve 2 is a stationary part of the frame of the bicycle, and one of its ends, as at 9, constitutes a fixed, stationary, or non-rotary brake-surface or clutch-section, for a purpose which will hereinafter appear. The crank-shaft 4 is provided at one end portion with a driven shaft or chain-wheel 10, designed to be geared through the medium of an endless chain 12 with a chain-wheel on the shaft of the rear drive-wheel of a bicycle. The chain-wheel is constructed at its center with a hub 13, provided with a screw-threaded orifice, with which engages the screw-threaded portion 14 of the crank-shaft 4 in such manner that while the chain-wheel is forced to rotate with the crank-shaft when the latter is rotated in a forward direction by pedaling, as usual, the chain-wheel is susceptible of slightly turning on and independent of the shaft. The hub 13 of the chain-wheel 10 is constructed with a circular ring-shaped flange 15, (best seen in Fig. 5,) which constitutes a rotary sleeve or driven shaft, extends into one end of the sleeve 2, and is provided with a plurality of orifices 16. The ring-like flange 15 is preferably formed integral with the hub of the chain-wheel; but I do not confine myself to this specific construction. The crank-shaft 4 is formed or otherwise provided with a plurality of cam projections 17 (best seen in Fig. 4) and having inclined rear edges or surfaces 18. These cam projections are arranged between the driving or crank shaft 4 and the driven shaft or rotary sleeve 15 and separate from one another, and the surfaces 19 between the projections are concentric with the internal surface of the non-rotary clutch-section 9. A brake shoe or block or split clutch-ring 20 (best seen in Fig. 6) is arranged to encircle the exterior of the ring-shaped flange 15, and this ring is susceptible of being uniformly or nearly uniformly expanded throughout its length between the ends which are produced by splitting the clutch-ring. The clutch-ring may be made of any material suitable for the purpose, and the same remarks apply to all the other parts of the invention. The ring, however, should be elastic or spring-like, so that it can be expanded and by its resiliency resume its normal condition or position. It is preferable to construct the clutch-ring of metal and face it on the exterior with some flexible or yielding material, such as leather. The leather surface and the split metal ring can be connected together by rivets 21 or by any other suitable means. When so constructed, the elastic ring may be considered as a spring for normally retracting or withdrawing the brake-shoe from the stationary brake-surface. The clutch-ring will normally hug the exterior of the ring flange 15, and consequently will rotate with the chain-wheel. It is preferable to provide the ring-shaped flange 15 with a rigid lug 22, which projects between the split parts of the clutch-ring, so that the latter will be forced to rotate with the ring flange of the chain-wheel.

The orifices 16 of the ring flange 15 are designed to contain radially-movable devices or objects 23, which, as herein shown, are in the shape of balls or spheres. These balls or spheres are susceptible of being pressed outwardly through the orifices 16 in the ring flange 15, so that they may be caused to press against the expansible clutch-ring at different points and uniformly or approximately uniformly force the exterior of the clutch-ring radially against the interior of the non-rotary clutch-section 9 to coöperate therewith and perform the braking function.

The crank-arm 6 of the crank-shaft 4 is connected with the chain-wheel 10 through the medium of a yielding connection composed in the present example of my invention of a curved or segmental rod 24, attached to a lug 25 on the chain-wheel and extending through an eye in a lug 26 on the crank-arm 6, a suitable spring 27 being interposed between the lug 26 and a head 28 on the end of the rod 24 opposite the end which is secured to the lug 25, the construction being such that when the crank-arm rises on its back stroke, as in Fig. 2, downward pressure can be exerted on the pedal 29 for the purpose of checking or retarding the forward motion of the crank-shaft 4, while at the same time the chain-wheel 10 will continue its forward motion in the direction of the arrow on the chain-wheel 10 in Fig. 2 due to the action of the endless chain as the bicycle or machine continues to advance.

When the rider is operating the pedal to propel the machine forward, the parts of the clutch mechanism constituting my invention will lie in the position shown by full lines, Fig. 1, in which position the radially-movable balls or spheres 23 lie partly in the orifices 16 of the rotary sleeve, driven shaft, or ring flange 15 and partly in the spaces between the cam projections 18 of the pedal-shaft 4. It will be observed also that the sleeve 2 is concentric with the shaft 4 and with the rotary sleeve, driven shaft, or ring flange 15. The expansible clutch-ring will also be contracted against the exterior of the ring flange 15 in such manner that the balls or spheres will be held against the surfaces 19 between the cam projections 18, so that rattling of the balls or spheres is prevented. The spring 27 will also be expanded, and consequently the crank-arm 6 will be so moved that its lateral lug 26 will lie in engagement with the lateral lug 25 of the chain-wheel. Whenever it is desired to apply the brake, it is only necessary for the rider to "back pedal" or rather exert slight downward pressure on the pedal 6 as it rises on its back stroke, which has the effect of retarding the forward rotation of the crank-shaft, while the chain-wheel 10, acted on by the chain 12, will continue its forward rotation, which is permitted by the compression of the spring 27 and the sliding of the curved or segmental rod 24 in the eye of the lug 26. Inasmuch as at this instant the chain-wheel rotates more swiftly than the crank-shaft the ring flange 15 of the chain-wheel will carry the balls or spheres 23 and cause them to ride up the inclined surfaces 18 of the cam projections 17, thereby forcing the balls or spheres outwardly against the expansible ring, which causes this ring to uniformly or approximately uniformly bear against the non-rotary clutch-section 9 for the purpose of arresting or stopping the forward motion of the chain-wheel of the bicycle or machine of which this chain-wheel forms a part.

In my invention the expansible split ring is entirely free or unattached at its ends, and consequently it can be uniformly expanded, so that all parts of its outer surface may be caused to press uniformly against the internal surface of the non-rotary clutch-section, whereby undue wear is avoided and any wear that may occur is evenly distributed.

I have illustrated in the drawings three balls or spheres 23 and three orifices 16 in the ring flange 15 on the hub of the chain-wheel; but I wish it understood that the number of balls or spheres and orifices may be increased or diminished without affecting the spirit of my invention. I advise the use of not less than three balls or spheres, as otherwise the expansible ring might not be uniformly pressed against the non-rotary clutch-section.

After the brake has been applied and it is desired to release the same it is only necessary to cease back pedaling or to relieve the pedal from pressure as it rises on its back stroke, whereupon the resiliency of the spring 27 will instantly restore the crank-arm 26 to its normal position, with the lug 26 of the crank-arm in contact with the lug 25 of the chain-wheel, whereby the crank-shaft will be swiftly rotated in a forward direction, so that the balls or spheres 23 will be disengaged from the cam projections and the elastic split ring can contract and assume the normal position shown in Fig. 1.

My improved brake mechanism is particularly useful in connection with bicycles; but I do not wish to confine myself to this particular class of machines, as obviously the invention may be used in connection with other wheeled vehicles adapted to be driven by the riders.

I have illustrated my improved brake mechanism arranged in operative connection with the shaft to which the pedal-carrying crank-arms are secured; but I do not confine myself to this particular arrangement.

Having thus described my invention, what I claim is—

1. A brake for bicycles comprising a fixed surface, a driving-shaft, a cam fast thereon, a rotary sleeve concentric with said shaft and capable of a limited rotary motion relative to said shaft, a brake-shoe rotating with said sleeve and in the same direction with the drive-wheel of the bicycle and also movable radially relative to said shaft, means for checking the rotary motion of said sleeve relative to said shaft, whereby said cam is caused to operate said brake-shoe, and a retracting-spring normally tending to withdraw said brake-shoe.

2. In a driving-gear, the combination with a driving-shaft, a driven shaft and a relatively stationary brake-surface concentric with the shafts, of a brake-shoe movable radially relatively to both shafts and adapted to coöperate with the brake-surface, and an incline between the shoe and one of the shafts, and means for forward propulsion, whereby when the speed of the driven shaft exceeds that of the driver the incline coöperating with the shoe will press the latter on the brake-surface.

3. The combination of a fixed annular clutch-section, a shaft, a wheel mounted on the shaft and having a circular part constructed with orifices or passages, a self-contracting, elastic clutch-ring carried by, normally clasping said part of, and rotating with the wheel, and around which the said fixed clutch-section is arranged, a series of radially-movable devices surrounded by the self-contracting clutch-ring and constructed to move in the orifices or passages of the circular part of the wheel, means on the shaft for forcing said radially-movable devices outward to expand the clutch-ring against the clutch-section, a crank-arm secured to the shaft, and a yielding connection between the said wheel and the crank-arm, substantially as described.

4. The combination with a non-rotary clutch-section, a shaft having a cam projection, a wheel on the shaft, an expansible clutch-ring, a radially-movable device acted on by the cam projection of the shaft to expand the clutch-ring against the non-rotary clutch-section, a crank-arm secured to the shaft, and a yielding connection between the said wheel and the crank-arm, substantially as described.

5. The combination of a shaft, a wheel mounted on the shaft and having a lateral projection, a fixed annular clutch-section, a self-contracting expansible clutch-ring normally encircling and clasping the lateral projection of the wheel and rotating with the latter, a crank-arm connected with the shaft, a spring connection between the crank-arm and the wheel, and devices arranged in the lateral projection of the wheel, encircled by the clutch-ring and operated by a part of the shaft to expand said ring outward against the internal surface of the said fixed clutch-section, substantially as described.

6. The combination of a shaft provided with crank-arms having pedals, a chain-wheel mounted on the shaft and having a lateral, circular flange, a non-rotary clutch-section, an expansible clutch-ring normally clasping and carried by said circular flange, a series of radially-movable devices arranged in the said flange for expanding the clutch-ring against the non-rotary clutch-section, and cams on the shaft for forcing the radially-movable devices outwardly to expand the clutch-ring, substantially as described.

7. The combination of a shaft having a crank-arm and cam projections, a chain-wheel having a lateral circular flange provided with orifices, a non-rotary clutch-section, an expansible clutch-ring encircling the said circular flange, a series of radially-movable devices acting through the orifices of the circular flange to expand the clutch-ring, means for actuating said radially-movable devices, and a yielding connection between the crank-arm and the chain-wheel, substantially as described.

In testimony whereof I have hereunto set my hand in presence of two subscribing witnesses.

ADAM C. HENDRICKS.

Witnesses:
 J. NELSON WISNER,
 J. N. WISNER, Jr.